US012450643B2

(12) United States Patent
Shiina et al.

(10) Patent No.: US 12,450,643 B2
(45) Date of Patent: Oct. 21, 2025

(54) SHOE PURCHASE RECOMMENDATION DEVICE

(71) Applicant: ASICS CORPORATION, Kobe (JP)

(72) Inventors: Ippei Shiina, Hyogo (JP); Chihiro Sugimori, Hyogo (JP); Ken Kusano, Hyogo (JP); Mai Nakaya, Hyogo (JP)

(73) Assignee: ASICS CORPORATION, Kobe (JP)

( * ) Notice: Subject to any disclaimer, the term of this patent is extended or adjusted under 35 U.S.C. 154(b) by 463 days.

(21) Appl. No.: 18/055,701

(22) Filed: Nov. 15, 2022

(65) Prior Publication Data
US 2023/0162265 A1 May 25, 2023

(30) Foreign Application Priority Data
Nov. 25, 2021 (JP) ................. 2021-190749

(51) Int. Cl.
G06Q 30/0601 (2023.01)
G06F 3/04817 (2022.01)
G06Q 10/1093 (2023.01)

(52) U.S. Cl.
CPC ..... *G06Q 30/0631* (2013.01); *G06F 3/04817* (2013.01); *G06Q 10/1093* (2013.01); *G06Q 30/0641* (2013.01)

(58) Field of Classification Search
CPC . G06Q 30/0641–0643; G06Q 30/0631; G06Q 10/109
See application file for complete search history.

(56) References Cited

U.S. PATENT DOCUMENTS 10,860,987 B2      12/2020  Cvetkovic et al.
10,956,874 B2 *    3/2021   Gurdin ................. G06Q 10/109
(Continued)

FOREIGN PATENT DOCUMENTS

CN      110088788 A      8/2019
CN      113383365 A      9/2021
(Continued)

OTHER PUBLICATIONS

Singh, S., et. al. "Footwear Size Recommendation System" arXiv: 1806.11423. https://doi.org/10.48550/arXiv.1806.11423 (Year: 2018).*
(Continued)

*Primary Examiner* — Kelly S. Campen
*Assistant Examiner* — Katherine A Barlow
(74) *Attorney, Agent, or Firm* — Studebaker Brackett PLLC

(57) ABSTRACT

A shoe purchase recommendation device includes: a user data storage unit that stores user data including at least an age and a foot size measurement value of a user; a foot size change prediction unit that calculates a change prediction value of a foot size of the user on the basis of the user data; a product information storage unit that stores product information including a shoe size; a purchase recommendation processing unit that determines a purchase-recommended date of shoes on the basis of the change prediction value and the product information; and a screen display processing unit that performs processing of displaying a notification screen containing a calendar display area in which a purchase-recommended date icon indicating the purchase-recommended date and a measurement-recommended date icon indicating a measurement-recommended date of the foot size are displayed on a calendar.

12 Claims, 14 Drawing Sheets

(56) References Cited

U.S. PATENT DOCUMENTS

| | | |
|---|---|---|
| 11,419,390 B2 | 8/2022 | Kagami et al. |
| 2008/0016451 A1* | 1/2008 | Funabashi .......... H04M 1/72427 715/757 |
| 2008/0250334 A1* | 10/2008 | Price .................. G06Q 30/0261 715/753 |
| 2009/0094138 A1* | 4/2009 | Sweitzer ................ G06Q 30/06 705/26.1 |
| 2009/0100332 A1 | 4/2009 | Kanjilal et al. |
| 2011/0029420 A1 | 2/2011 | Bianco et al. |
| 2014/0336796 A1* | 11/2014 | Agnew .................... G09B 5/06 700/91 |
| 2016/0357768 A1* | 12/2016 | Strong .................... G06F 16/29 |
| 2018/0136954 A1 | 5/2018 | Gurdin et al. |
| 2018/0174110 A1* | 6/2018 | Cvetkovic ............. G06Q 30/06 |
| 2021/0065134 A1* | 3/2021 | Chhabra ............. G06F 3/04847 |
| 2021/0251345 A1 | 8/2021 | Kagami et al. |
| 2022/0095748 A1 | 3/2022 | Kagami et al. |

FOREIGN PATENT DOCUMENTS

| | | |
|---|---|---|
| EP | 3 866 097 A1 | 8/2021 |
| JP | H08-263550 A | 10/1996 |
| JP | 2020-031720 A | 3/2020 |
| WO | 2011/017161 A2 | 2/2011 |
| WO | 2021/130889 A1 | 7/2021 |

OTHER PUBLICATIONS

Huang, S., et. al. Guess your size: A hybrid model for footwear size recommendation, Advanced Engineering Informatics, vol. 36, pp. 64-75, ISSN 1474-0346, https://doi.org/10.1016/j.aei.2018.02.003. (Year: 2018).*

The extended European search report issued by the European Patent Office on Apr. 21, 2023, which corresponds to European Patent Application No. 22207054.2-1218 and is related to U.S. Appl. No. 18/055,701.

An Office Action mailed by China National Intellectual Property Administration on May 15, 2025, which corresponds to Chinese Patent Application No. 202211446340.8 and is related to U.S. Appl. No. 18/055,701; with English language translation.

An Office Action; "Notice of Reasons for Refusal," mailed by the Japanese Patent Office on May 20, 2025, which corresponds to Japanese Patent Application No. 2021-190749 and is related to U.S. Appl. No. 18/055,701; with English language translation.

* cited by examiner

SHOE PURCHASE RECOMMENDATION DEVICE

CROSS-REFERENCE TO RELATED APPLICATIONS

The present application claims priority to and incorporates by reference the entire contents of Japanese Patent Application No. 2021-190749 filed in Japan on Nov. 25, 2021.

BACKGROUND OF THE INVENTION

1. Field of the Invention

The present invention relates to a shoe purchase recommendation device that predicts a change in a foot size of a prediction target person and recommends purchase of shoes.

It is desired to wear shoes having an appropriate volume suited to the foot size of a wearer, such as a foot length, a foot circumference, and an arch height, and wearing shoes having an inappropriate volume may cause hallux valgus or may cause a shoe blister. In particular, when the wearer is a child, wearing shoes having an inappropriate volume sometimes adversely affect the growth of the foot.

Since the foot size changes with growth and aging, even a shoe having an optimum volume for the current foot size will not have an optimum volume for the foot size in the future in some cases.

WO 2021/130889 A discloses an invention that predicts a change in height and a change in a foot length and notifies a customer of a replacement purchase of shoes.

WO 2021/130889 A discloses that a change in a foot length is predicted and a customer is notified of a replacement purchase of shoes, but does not disclose a specific method for notifying of a replacement purchase opportunity. Therefore, in the invention disclosed in WO 2021/130889 A, the user is not allowed to be notified of a timing appropriate for purchasing shoes in an easy-to-understand manner.

The present invention has been made in view of the above, and an object of the present invention is to obtain a shoe purchase recommendation device capable of notifying a user of a timing appropriate for purchasing shoes in an easy-to-understand manner.

SUMMARY OF THE INVENTION

In order to solve the above-described problem and achieve the object, a shoe purchase recommendation device according to the present invention includes, a user data storage unit that stores user data including at least an age and a foot size measurement value of a user, a foot size change prediction unit that calculates a change prediction value of a foot size of the user on a basis of the user data, a product information storage unit that stores product information including a shoe size, a purchase recommendation processing unit that determines a purchase-recommended date of shoes on a basis of the change prediction value and the product information, and a screen display processing unit that performs processing of displaying a notification screen containing a calendar display area in which a purchase-recommended date icon indicating the purchase-recommended date and a measurement-recommended date icon indicating a measurement-recommended date of the foot size are displayed on a calendar.

DETAILED DESCRIPTION OF THE PREFERRED EMBODIMENTS

Hereinafter, embodiments of a shoe purchase recommendation device according to the present invention will be described in detail with reference to the drawings. Note that the present invention is not limited by these embodiments. In addition, in the embodiments to be described below, the same or common parts are denoted by the same reference signs, and the description thereof will not be repeated.

In the following description, a case where the foot size is the foot length will be taken as an example. However, the foot size only has to be dimensions of a measurable portion, such as a foot circumference and an arch height, and is not limited to dimensions of a specific portion. In addition, the foot size may be a combination of dimensions of different portions of the foot, such as the foot length, the foot circumference, and the arch height, or may be three-dimensional scan data of the user's foot. Furthermore, not only the whole size of the foot but also the dimensions of a part of the shoe corresponding to the foot length, the foot circumference, the arch height, or the like may be regarded as the foot size.

First Embodiment

Figure 1:
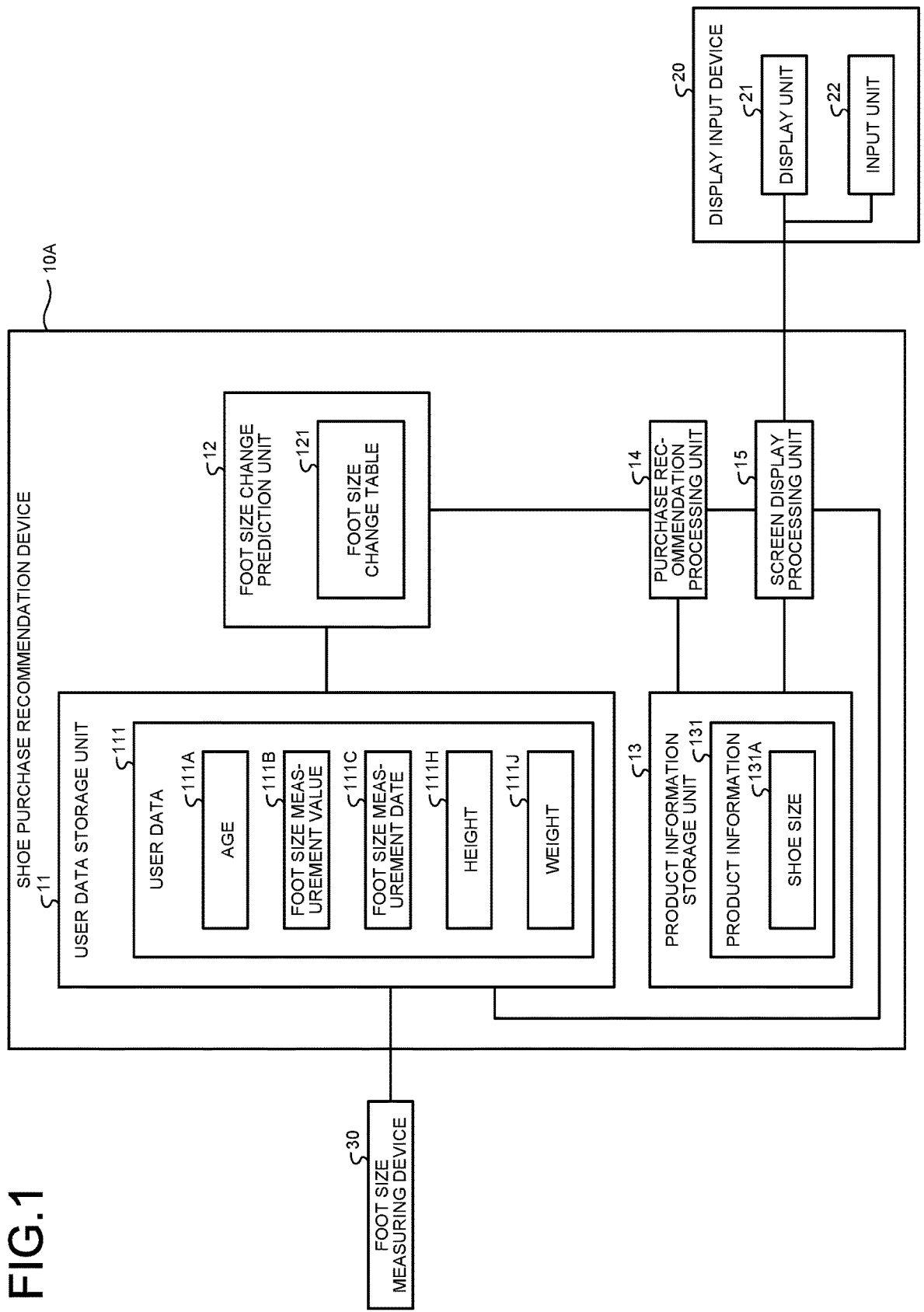
FIG. 1 is a diagram illustrating a configuration of a shoe purchase recommendation device according to a first embodiment of the present invention.

FIG. 1 is a diagram illustrating a configuration of a shoe purchase recommendation device according to a first embodiment of the present invention. A shoe purchase recommendation device 10A includes: a user data storage unit 11 that stores user data 111 including at least an age 111A, a foot size measurement value 111B, and a foot size measurement date 111C of a user; a foot size change prediction unit 12 that calculates a change prediction value of a foot size of the user on the basis of the user data 111; a product information storage unit 13 that stores product information 131 including a shoe size 131A; a purchase recommendation processing unit 14 that determines a purchase-recommended date and a purchase-recommended product of shoes on the basis of the change prediction value and the product information 131; and a screen display processing unit 15 that performs processing of displaying the purchase-recommended date and the purchase-recommended product of the shoes, and a foot size measurement-recommended date. The foot size measurement value 111B is a measurement value of the foot size of the user measured in the past. The foot size measurement date 111C is a date on which the foot size was measured in the past. The age 111A is data representing elapsed time from birth. The age 111A may be in "month old" representing the elapsed time from birth in units of months, instead of units of years.

The foot size change prediction unit 12 holds a foot size change table 121, which is statistical data of changes in the foot size, and calculates a change prediction value of the foot size by adding an average change amount of the foot size based on the age 111A to the foot size measurement value 111B. The foot size change prediction unit 12 can calculate not only the prediction value of the foot size at a future time point dependent on the current foot size measurement value 111B as a basis, but also the prediction value of the foot size at a past time point dependent on the past foot size measurement value 111B as a basis. Note that the foot size change prediction unit 12 may calculate the change prediction value of the foot size by adding the change amount of the foot size based on data of the foot size of an older family member of the user included in the user data 111 stored in the user data storage unit 11, to the foot size measurement value 111B.

In addition to the age 111A, the foot size measurement value 111B, and the foot size measurement date 111C, the user data 111 may include the height, weight, gender, residential region, current foot size data of the family member, and past foot size data of the family member. The foot size change prediction unit 12 calculates the change prediction value of the foot size using these pieces of information, whereby the change prediction value can be calculated by more accurately predicting the change in the foot size. In the shoe purchase recommendation device 10A according to the first embodiment, the user data 111 includes a height 111H and a weight 111J of the user. Therefore, by calculating the change prediction value of the foot size using the age 111A, the height 111H, and the weight 111J of the user and the foot size measurement value 111B at the time point of the input age, the foot size change prediction unit 12 can calculate the foot size prediction value in consideration of the physique of the user.

A display input device 20 including a display unit 21 and an input unit 22 is connected to the shoe purchase recommendation device 10A. A liquid crystal display or an organic electroluminescence display can be applied as the display unit 21, but a display device other than these displays may be adopted. Input devices such as a keyboard and a pointing device can be applied as the input unit 22, but an input device other than these input devices may be adopted. Note that a touch screen monitor having both of a display function and an input function together can also be applied as the display unit 21 and the input unit 22. The display input device 20 is connected to the shoe purchase recommendation device 10A via the Internet. Note that the display input device 20 may be directly connected to the shoe purchase recommendation device 10A not via the Internet. In addition, the shoe purchase recommendation device 10A may include the display unit 21 and the input unit 22. In this case, the display input device 20 does not have to be connected to the shoe purchase recommendation device 10A.

A foot size measuring device 30 is connected to the shoe purchase recommendation device 10A. The foot size measuring device 30 outputs the foot size measurement value 111B and the foot size measurement date 111C obtained by measuring the foot size of the user. The foot size measurement value 111B and the foot size measurement date 111C are accumulated in the user data storage unit 11. Note that the shoe purchase recommendation device 10A may be provided with a user interface for input such that the foot size measurement value 111B and the foot size measurement date 111C are input by operating the user interface. In addition, the shoe purchase recommendation device 10A may acquire the foot size measurement value 111B and the foot size measurement date 111C by communicating with another device that stores the foot size measurement value 111B and the foot size measurement date 111C. Furthermore, the foot size measurement date 111C does not have to be data separated from the foot size measurement value 111B and may be data of creation date and time or update date and time included in the file property of the foot size measurement value 111B. Note that the foot size measuring device 30 may be a device integrated with the display input device 20.

To give an example, a server of a shoe manufacturer can be applied as the shoe purchase recommendation device 10A. In addition, a smartphone terminal of the user can be applied as the display input device 20. Furthermore, a three-dimensional foot last automatic measuring instrument or an information terminal such as a smartphone terminal and a tablet terminal of the user can be applied as the foot size measuring device 30.

The shoes are set with a foot size fitting range for each size. To give an example, for a certain shoe having a size of 20 cm, a foot length of 19.15 cm to 19.56 cm is set as the foot size fitting range. Accordingly, the day on which the foot length of the user reaches 19.15 cm is the purchase-recommended date on which the purchase of the shoes having a size of 20 cm is recommended. In this manner, the purchase recommendation processing unit 14 determines the day on which the change prediction value of the foot size of the user reaches the foot size fitting range of shoes that are the purchase target recommended product, as the purchase-recommended date.

The screen display processing unit 15 sets the day on which a preset period elapses from the previous foot size measurement date 111C, as the measurement-recommended date.

Figure 2:
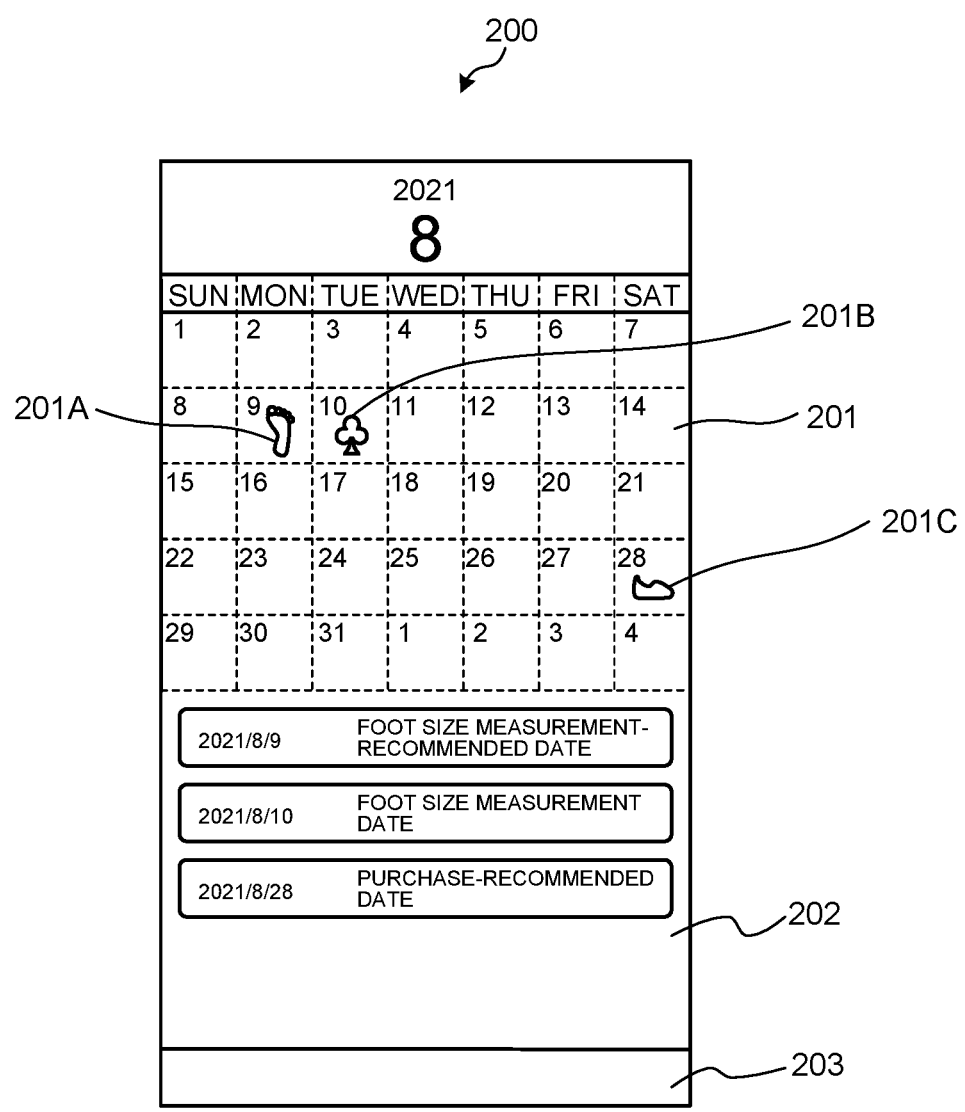
FIG. 2 is a diagram illustrating an example of a notification screen displayed on a display device by a screen display processing unit of the shoe purchase recommendation device according to the first embodiment.

FIG. 2 is a diagram illustrating an example of a notification screen displayed on a display device by the screen display processing unit of the shoe purchase recommendation device according to the first embodiment. A notification screen 200 contains a calendar display area 201, a list display area 202, and a sub-icon display area 203.

In the calendar display area 201, a measurement-recommended date icon 201A, a measurement date icon 201B, and a purchase-recommended date icon 201C are displayed. The measurement-recommended date icon 201A is an icon representing the foot size measurement-recommended date on which the user is recommended to measure the foot size. The measurement date icon 201B is an icon representing the foot size measurement date on which the user measured the foot size. The purchase-recommended date icon 201C is an icon representing the purchase-recommended date on which the user is recommended to purchase shoes. The foot size measurement-recommended date is set on the day on which a predetermined number of days elapses from the previous foot size measurement date.

Figure 3:
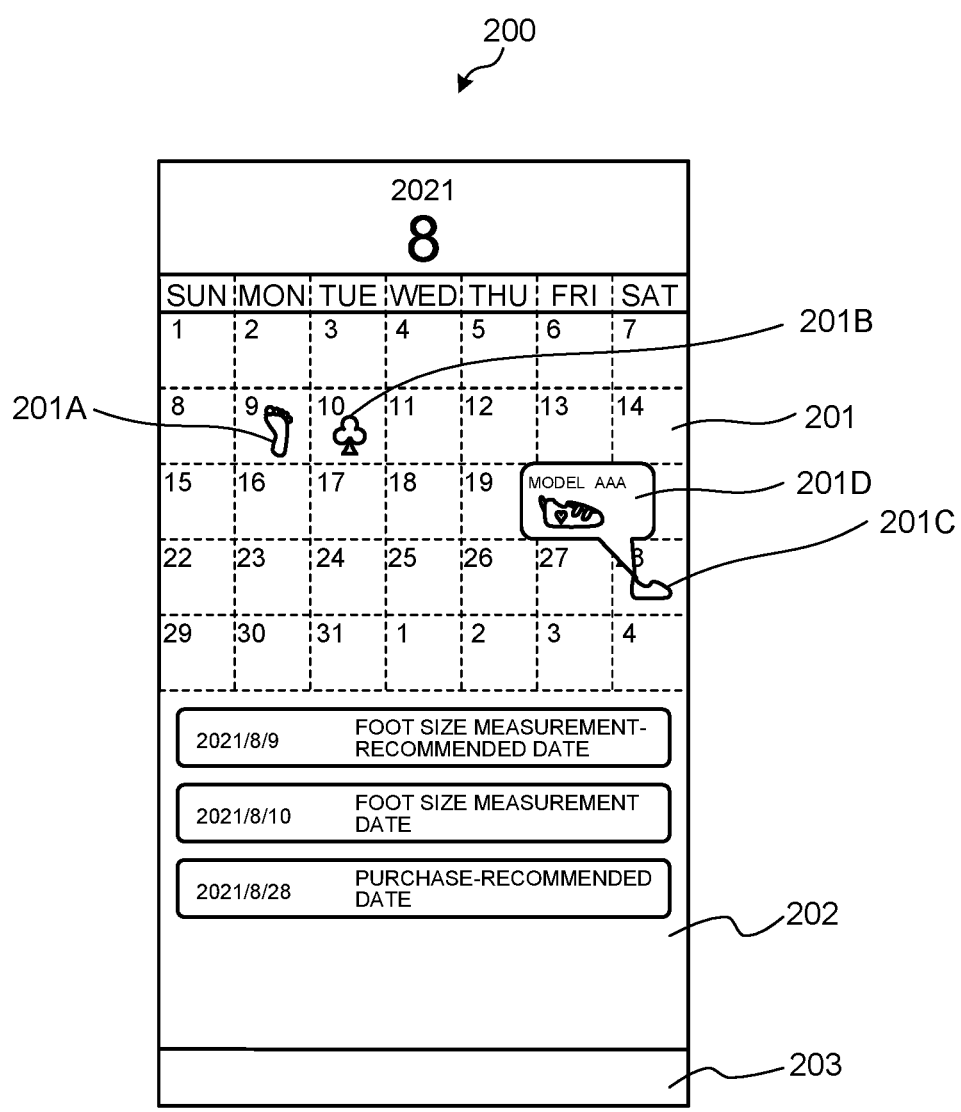
FIG. 3 is a diagram illustrating another example of the notification screen displayed on the display device by the screen display processing unit of the shoe purchase recommendation device according to the first embodiment.

FIG. 3 is a diagram illustrating another example of the notification screen displayed on the display device by the screen display processing unit of the shoe purchase recommendation device according to the first embodiment. By pressing the purchase-recommended date icon 201C, a balloon 201D containing detailed information such as the model number and the image of the purchase-recommended product is displayed on the notification screen 200.

Figure 4:
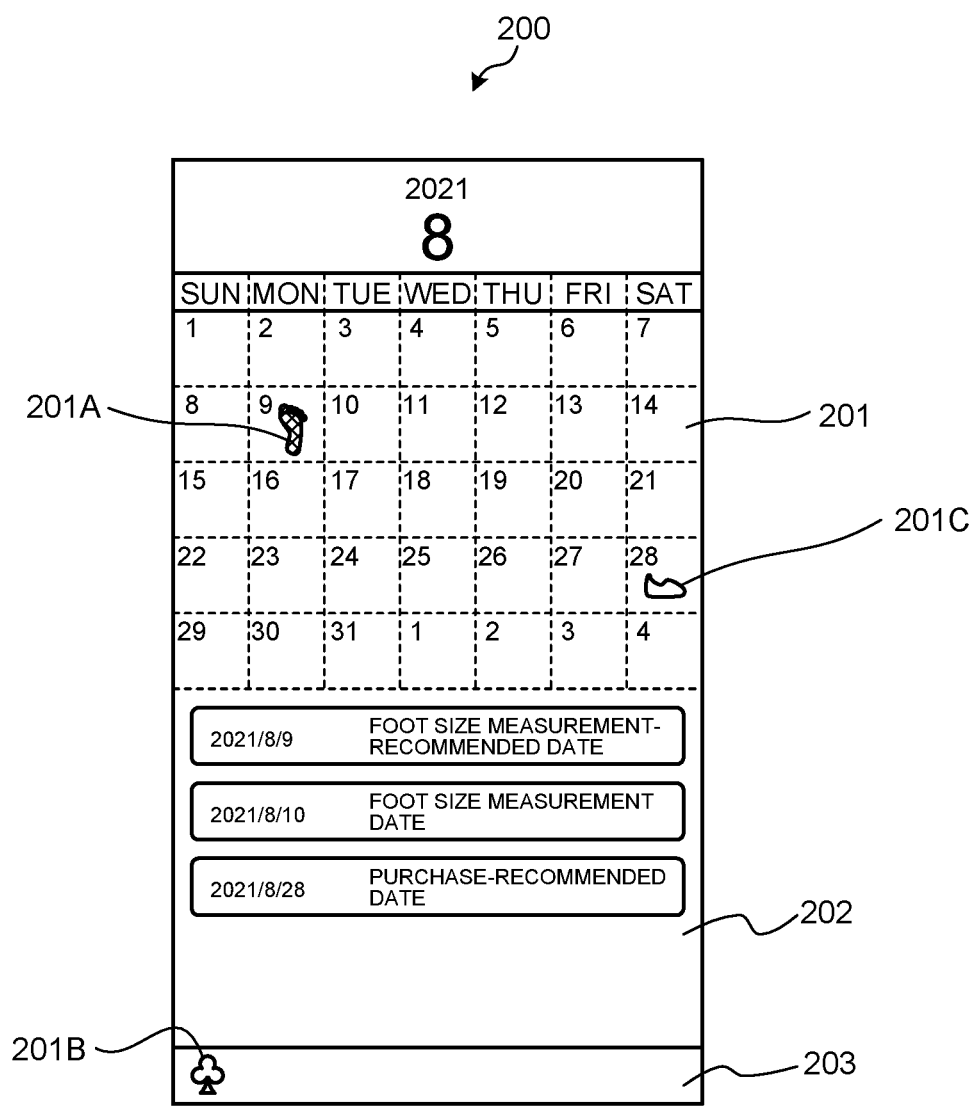
FIG. 4 is a diagram illustrating another example of the notification screen displayed on the display device by the screen display processing unit of the shoe purchase recommendation device according to the first embodiment.

FIG. 4 is a diagram illustrating another example of the notification screen displayed on the display device by the screen display processing unit of the shoe purchase recommendation device according to the first embodiment. When the user measures the foot size on the foot size measurement-recommended date, the measurement-recommended date icon 201A is displayed in the calendar display area 201, and the measurement date icon 201B is displayed in the sub-icon display area 203. The measurement-recommended date icon 201A displayed in the calendar display area 201 is displayed in a color different from the case where the foot size measurement-recommended date does not overlap the foot size measurement date. Here, the case where the foot size measurement-recommended date and the foot size measurement date overlap has been taken as an example. However, also in the case where the foot size measurement-recommended date and the purchase-recommended date overlap, the measurement-recommended date icon 201A is displayed in the calendar display area 201, and the purchase-recommended date icon 201C is displayed in the sub-icon display area 203, similarly. In this manner, when the foot size measurement-recommended date overlaps with the date of another matter, the measurement-recommended date icon 201A is displayed in the calendar display area 201, and the icon indicating the another matter is displayed in the sub-icon display area 203. Note that, when the matters other than the foot size measurement-recommended date overlap each other, the icons displayed in the calendar display area 201 and the icons displayed in the sub-icon display area 203 are determined in accordance with a predetermined priority order.

When a plurality of matters overlap, the icon indicating one of the matters is displayed in a color different from a normal color in the calendar display area 201, and the icons indicating the remaining matters are displayed in the sub-icon display area 203, whereby, even when a plurality of matters overlap and occur on the same day, it becomes difficult for the user to overlook the matters.

Note that the icons displayed in the sub-icon display area 203 may have designs different from the designs of the icons displayed in the calendar display area 201.

Figure 5:
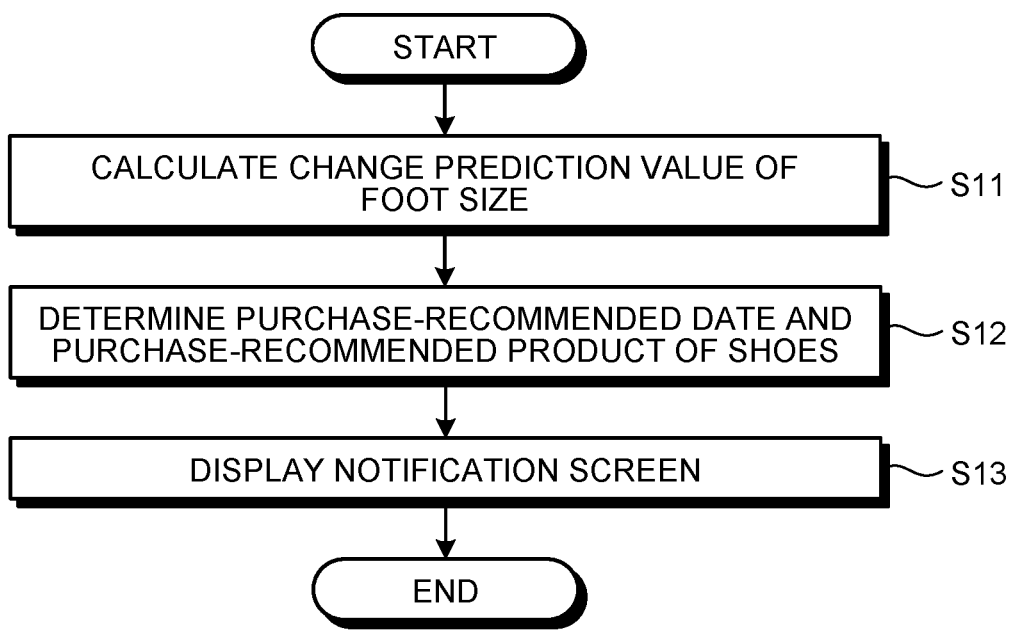
FIG. 5 is a flowchart illustrating a flow of action of the shoe purchase recommendation device according to the first embodiment.

FIG. 5 is a flowchart illustrating a flow of action of the shoe purchase recommendation device according to the first embodiment. In step S11, the foot size change prediction unit 12 calculates the change prediction value of the foot size of the user on the basis of the user data 111 stored in the user data storage unit 11. In step S12, the purchase recommendation processing unit 14 determines the purchase-recommended date and the purchase-recommended product of shoes on the basis of the change prediction value calculated by the foot size change prediction unit 12 and the product information 131 stored in the product information storage unit 13.

In step S13, the screen display processing unit 15 performs processing of displaying the notification screen 200.

The shoe purchase recommendation device 10A according to the first embodiment displays the purchase-recommended date icon 201C in the calendar display area 201 of the notification screen 200 and thus can notify the user of a timing appropriate for purchasing shoes in an easy-to-understand manner. In addition, even when a shoe purchase-recommended date and the foot size measurement-recommended date overlap, the purchase-recommended date icon 201C is displayed in the sub-icon display area 203, and thus, the user can be notified of a timing appropriate for purchasing shoes in an easy-to-understand manner. Also when the shoe purchase-recommended date overlaps with a matter other than the foot size measurement date, the purchase-recommended date icon 201C is displayed in the calendar display area 201 or the sub-icon display area 203, and thus, the user can be notified of a timing appropriate for purchasing shoes in an easy-to-understand manner.

Second Embodiment

Figure 6:
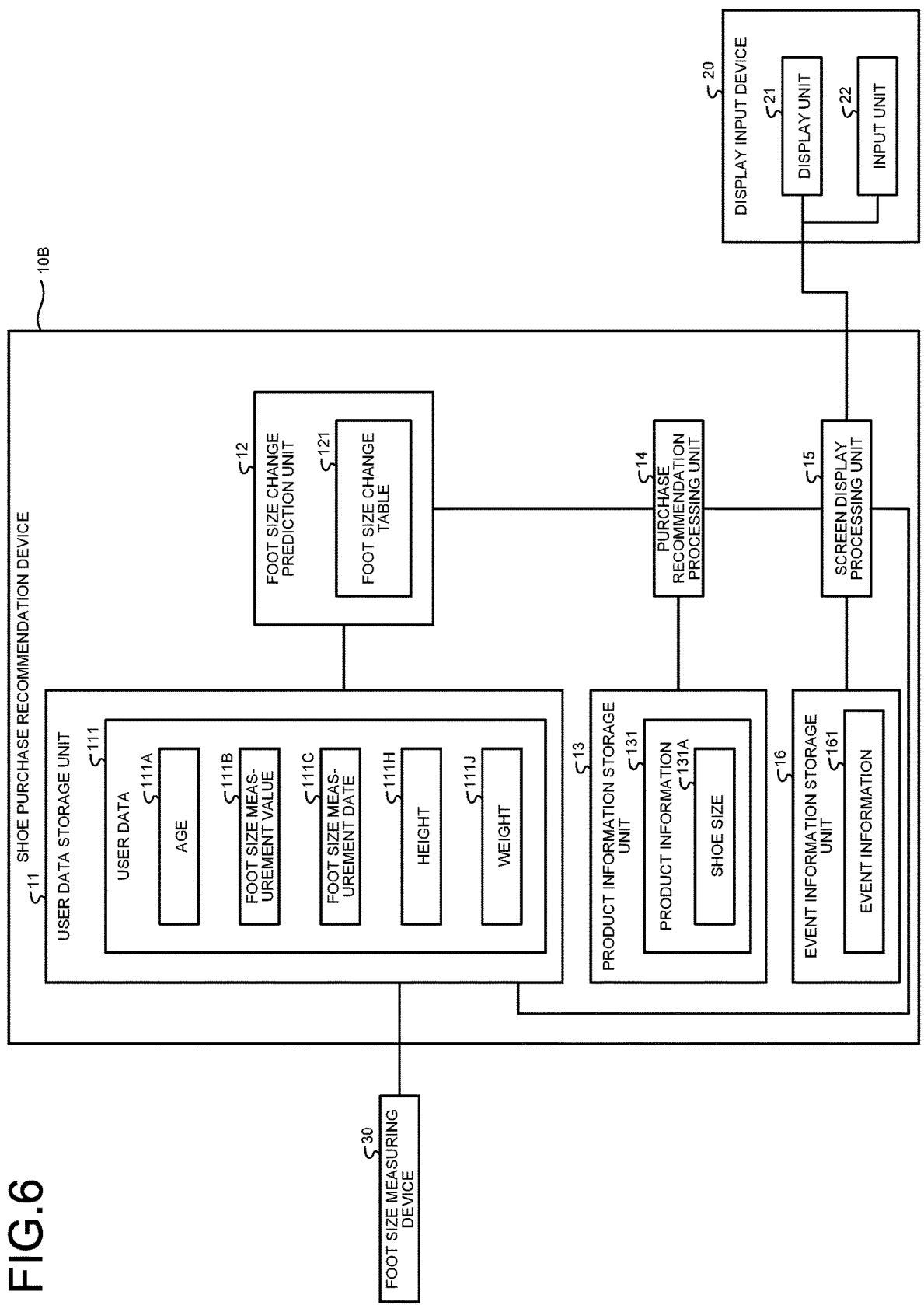
FIG. 6 is a diagram illustrating a configuration of a shoe purchase recommendation device according to a second embodiment of the present invention.

FIG. 6 is a diagram illustrating a configuration of a shoe purchase recommendation device according to a second embodiment of the present invention. A shoe purchase recommendation device 10B according to the second embodiment is different from the shoe purchase recommendation device 10A according to the first embodiment in including an event information storage unit 16. The event information storage unit 16 stores event information 161. The event information 161 is information regarding events such as the holding of a sports tournament, the release of a new product, and a sporting ability measuring meeting.

Figure 7:
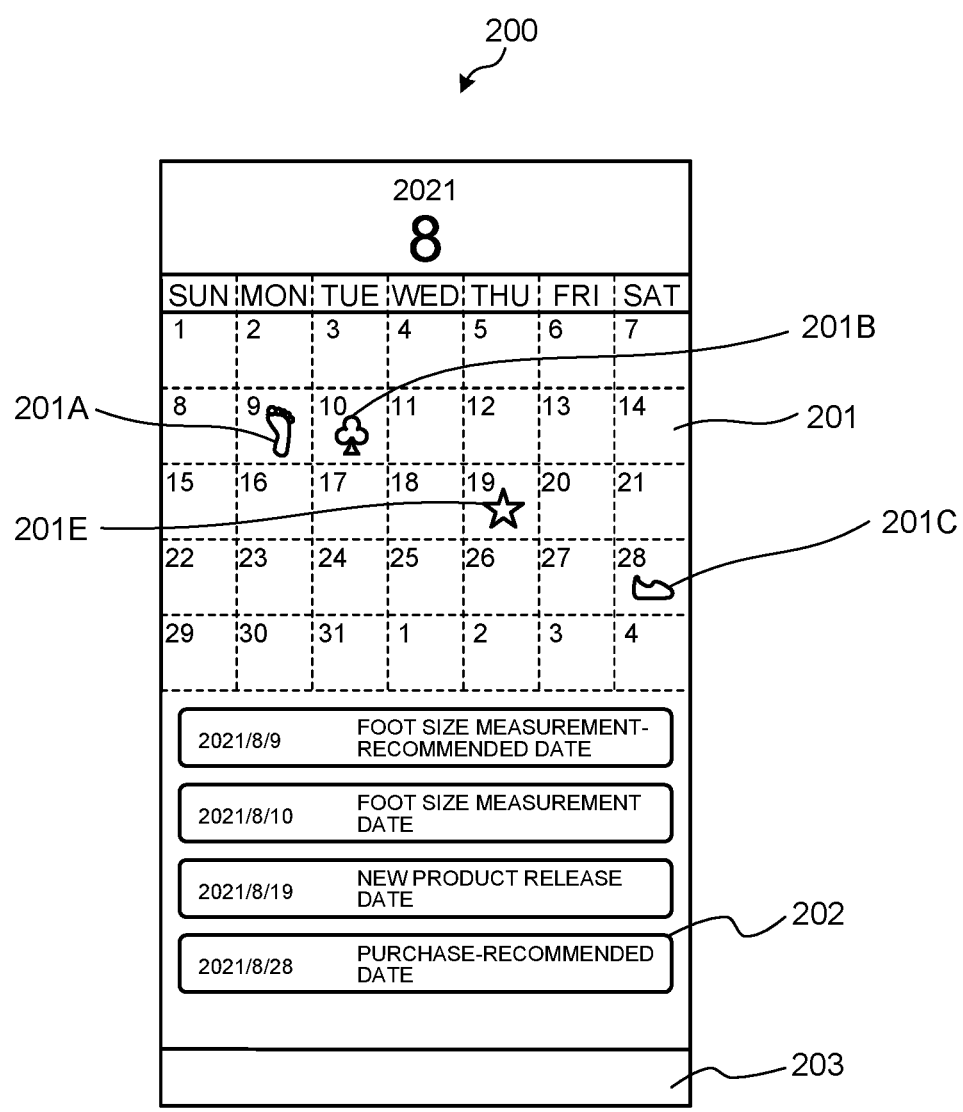
FIG. 7 is a diagram illustrating an example of a notification screen displayed on a display device by a screen display processing unit of the shoe purchase recommendation device according to the second embodiment.

FIG. 7 is a diagram illustrating an example of a notification screen displayed on a display device by a screen display processing unit of the shoe purchase recommendation device according to the second embodiment. In a calendar display area 201, an event icon 201E is displayed in addition to a measurement-recommended date icon 201A, a measurement date icon 201B, and a purchase-recommended date icon 201C.

The shoe purchase recommendation device 10B according to the second embodiment displays the event icon 201E regarding an event for which the event information 161 is stored in the event information storage unit 16 and thus can notify the user of the date on which the event occurs in an easy-to-understand manner.

Third Embodiment

Figure 8:
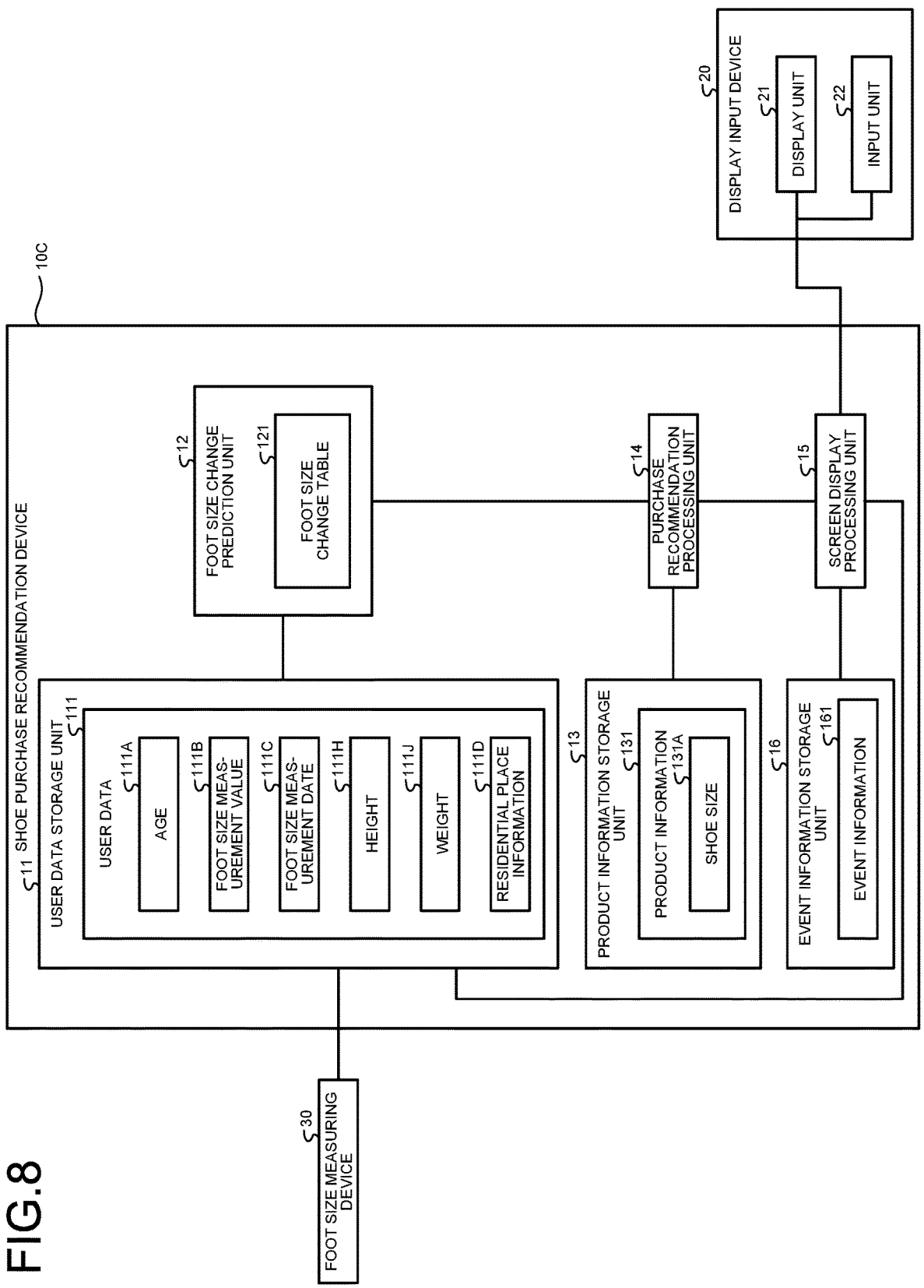
FIG. 8 is a diagram illustrating a configuration of a shoe purchase recommendation device according to a third embodiment of the present invention.

FIG. 8 is a diagram illustrating a configuration of a shoe purchase recommendation device according to a third embodiment of the present invention. A shoe purchase recommendation device 10C according to the third embodiment is different from the shoe purchase recommendation device 10B according to the second embodiment in that residential place information 111D is included in user data 111. The residential place information 111D is information indicating a region where the user lives. The residential place information 111D does not have to be an accurate address.

Figure 9:
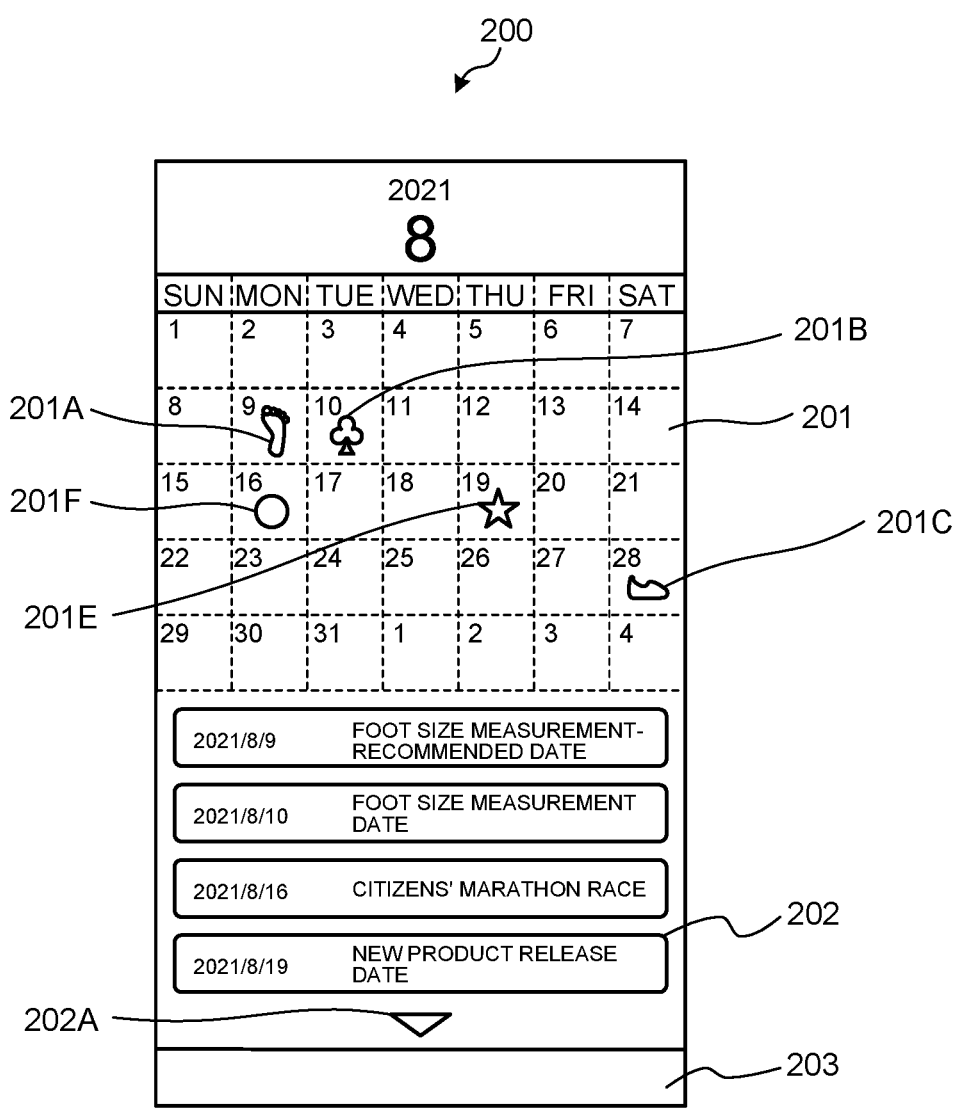
FIG. 9 is a diagram illustrating an example of a notification screen displayed on a display device by a screen display processing unit of the shoe purchase recommendation device according to the third embodiment.

FIG. 9 is a diagram illustrating an example of a notification screen displayed on a display device by a screen display processing unit of the shoe purchase recommendation device according to the third embodiment. In a calendar display area 201, a regional event icon 201F is displayed in addition to a measurement-recommended date icon 201A, a measurement date icon 201B, a purchase-recommended date icon 201C, and an event icon 201E. The regional event icon 201F is an icon representing an event held in the vicinity of the residential place of the user. A screen display processing unit 15 determines an event to be displayed as the regional event icon 201F from among the events registered in the event information 161 on the basis of the residential place information 111D.

A scroll button 202A is displayed in a list display area 202. The scroll button 202A is displayed when the number of events including the foot size measurement-recommended date, the foot size measurement date, and the purchase-recommended date exceeds the number that can be displayed in the list display area 202. By pressing the scroll button 202A, some of the events displayed in the list display area 202 are hidden, and some of the events that have been hidden are displayed. That is, the user can switch events displayed in the list display area 202 by pressing the scroll button 202A.

The shoe purchase recommendation device 10C according to the third embodiment displays the regional event icon 201F regarding the event held in the vicinity of the residential place of the user, on the notification screen 200, and thus can notify the user of the date on which the event that the user can easily participate in occurs, in an easy-to-understand manner.

Note that an application genre, which is a sports genre in which the shoes are used, may be included in product information 131, and a purchase recommendation processing unit 14 may determine the purchase-recommended product, from among the shoes of which the application genre matches the sports genre of an event held in the vicinity of the residential place of the user targeted for display by the regional event icon 201F, and calculate the purchase-recommended date. By configuring in the above manner, the user can be notified of a timing appropriate for purchasing shoes desired for participating in the event held in the vicinity of the residential place of the user in an easy-to-understand manner.

Fourth Embodiment

Figure 10:
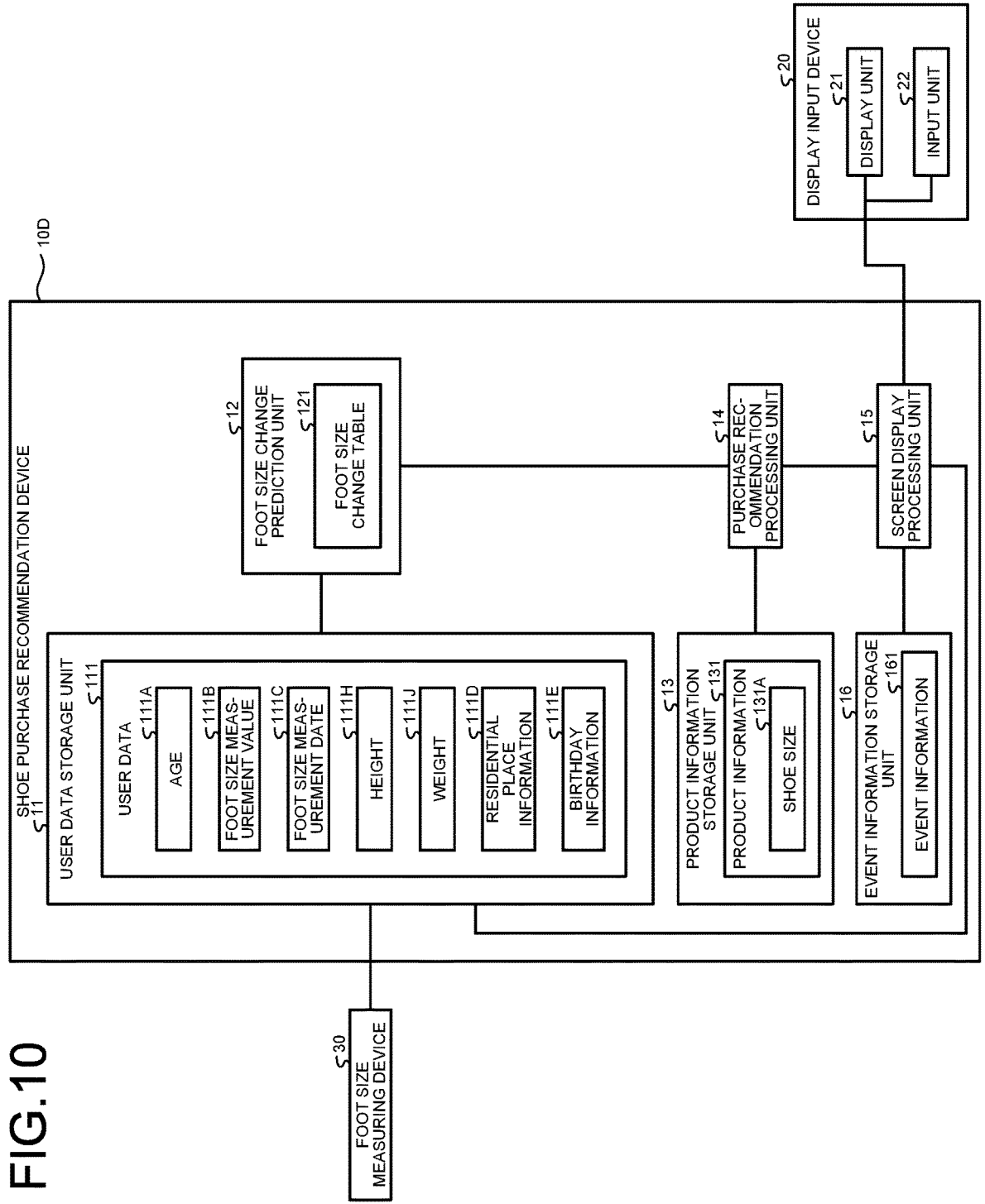
FIG. 10 is a diagram illustrating a configuration of a shoe purchase recommendation device according to a fourth embodiment of the present invention.

FIG. 10 is a diagram illustrating a configuration of a shoe purchase recommendation device according to a fourth embodiment of the present invention. A shoe purchase recommendation device 10D according to the fourth embodiment is different from the shoe purchase recommendation device 10C according to the third embodiment in that birthday information 111E, which is information on the birthday of a user, is included in user data 111.

Figure 11:
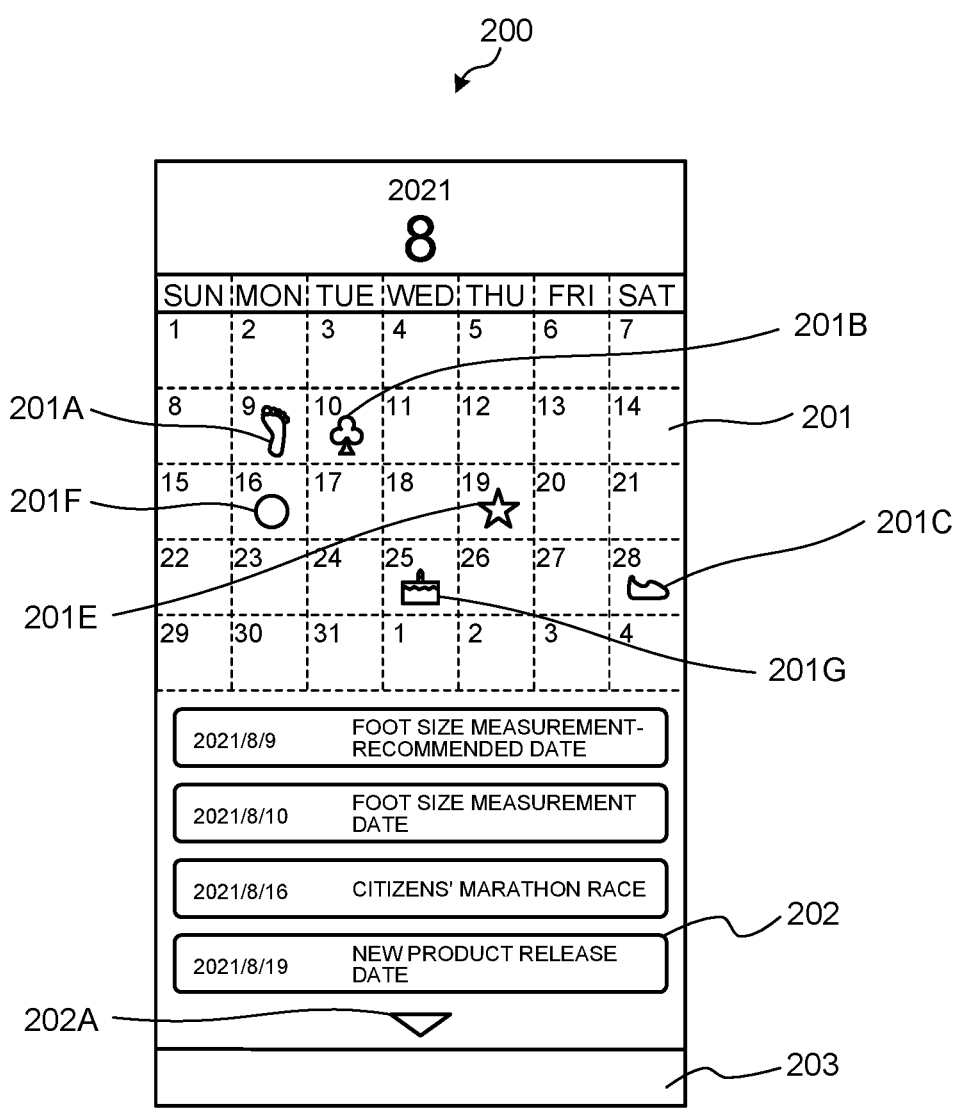
FIG. 11 is a diagram illustrating an example of a notification screen displayed on a display device by a screen display processing unit of the shoe purchase recommendation device according to the fourth embodiment.

FIG. 11 is a diagram illustrating an example of a notification screen displayed on a display device by a screen display processing unit of the shoe purchase recommendation device according to the fourth embodiment. In a calendar display area 201, a birthday icon 201G is displayed in addition to a measurement-recommended date icon 201A, a measurement date icon 201B, a purchase-recommended date icon 201C, an event icon 201E, and a regional event icon 201F.

The shoe purchase recommendation device 10D according to the fourth embodiment displays the birthday icon 201G indicating the birthday of the user on a notification screen 200 and thus can notify the user of the life event of the user in an easy-to-understand manner.

Fifth Embodiment

Figure 12:
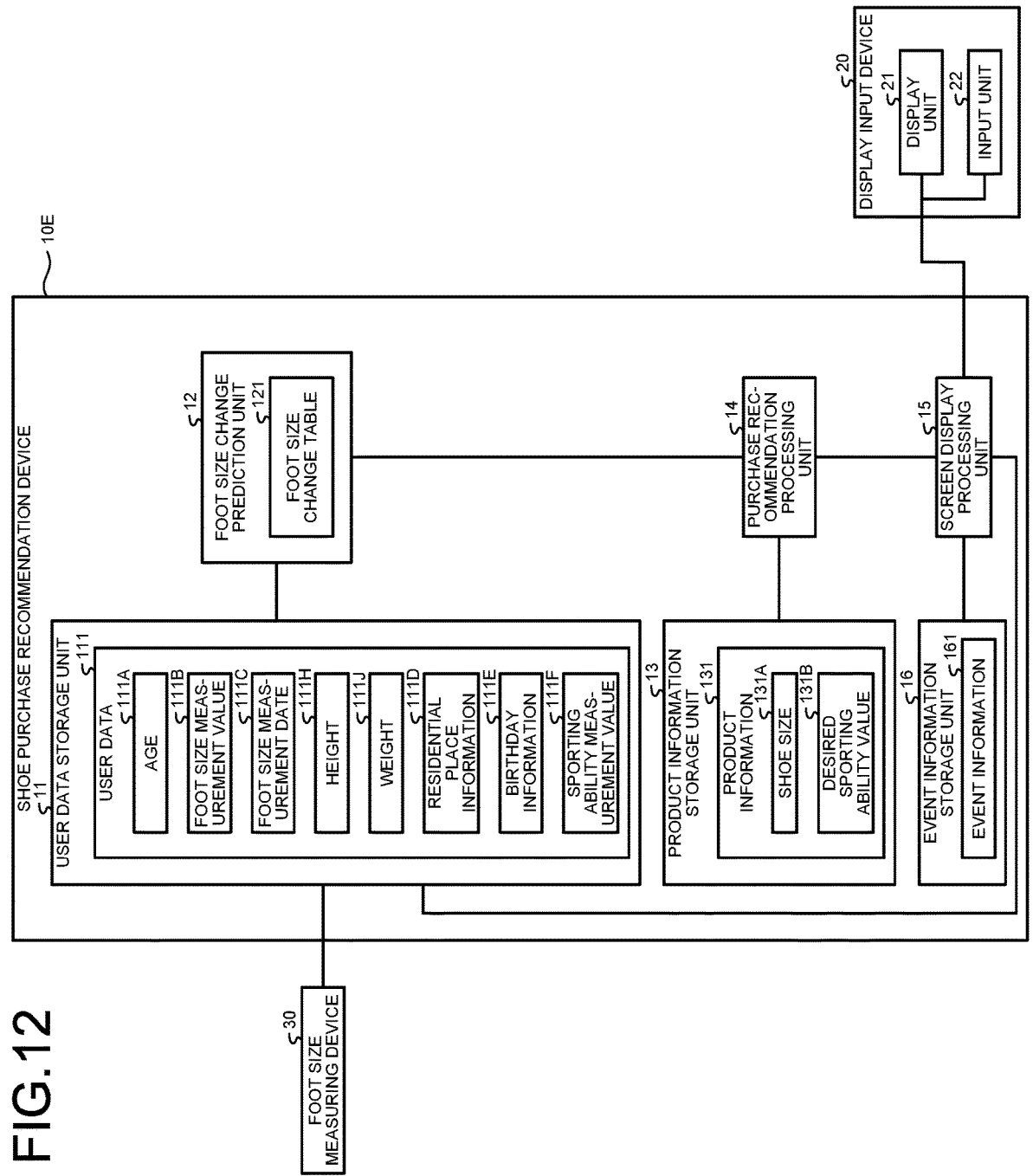
FIG. 12 is a diagram illustrating a configuration of a shoe purchase recommendation device according to a fifth embodiment of the present invention.

FIG. 12 is a diagram illustrating a configuration of a shoe purchase recommendation device according to a fifth embodiment of the present invention. A shoe purchase recommendation device 10E according to the fifth embodiment is different from the shoe purchase recommendation device 10D according to the fourth embodiment in that a sporting ability measurement value 111F, which is a measurement result for the sporting ability of a user, is included in user data 111, and a desired sporting ability value 131B, which is information on the sporting ability coupled with the shoes, is included in product information 131.

The sporting ability measurement value 111F is a measurement value of the sporting ability measured in a sporting ability measuring event registered in event information 161. Examples of the sporting ability include, but are not limited to, the time of short-distance running, the time of long-distance running, the height of vertical jump, and the number of times of repeated side stepping. The desired sporting ability value 131B indicates the sporting ability desired to draw out the original potential of the shoes, and when the sporting ability measurement value 111F of the wearer of the shoes is equal to or less than the desired sporting ability value 131B, the original potential of the shoes will not be allowed to be drawn out.

A purchase recommendation processing unit 14 determines the purchase-recommended product, from among shoes of which the desired sporting ability value 131B is equal to or less than the sporting ability measurement value 111F, and calculates the purchase-recommended date.

The shoe purchase recommendation device 10E according to the fifth embodiment displays a notification screen 200 similar to the notification screen 200 of the shoe purchase recommendation device 10D according to the fourth embodiment, on a display input device 20.

The shoe purchase recommendation device 10E according to the fifth embodiment urges the measurement of the sporting ability value by displaying the regional event icon 201F of a sporting ability measuring event on the notification screen 200 and displays the purchase-recommended date icon 201C regarding the shoes of which the desired sporting ability value 131B is equal to or less than the sporting ability measurement value 111F measured in the sporting ability measuring event, on the notification screen 200. Accordingly, the shoe purchase recommendation device 10E according to the fifth embodiment can notify the user of the purchase-recommended date of the shoes fitting to the sporting ability of the user in an easy-to-understand manner.

In particular, in sports shoes, a plurality of models is sometimes provided by performance of the wearer. In general, a model for beginners has specifications that give more importance on ease of handling than potential, whereas a model for advanced-level persons has specifications that give more importance on potential than ease of handling. Accordingly, if a person with low sporting ability wears a model for advanced-level persons, the original potential of the shoes will not be allowed to be sufficiently drawn out, and as a result, the wearer will not be able to sufficiently exhibit the own performance of the wearer. In addition, if a person with high sporting ability wears a model for beginners, the wearer will not be able to sufficiently exhibit the own performance of the wearer because the wearer is restricted by the potential of the shoes. By determining shoes recommended to purchase on the basis of the sporting ability of the user, the shoe purchase recommendation device 10E according to the fifth embodiment can recommend the purchase of the shoes that allow the user to easily exhibit performance.

Sixth Embodiment

Figure 13:
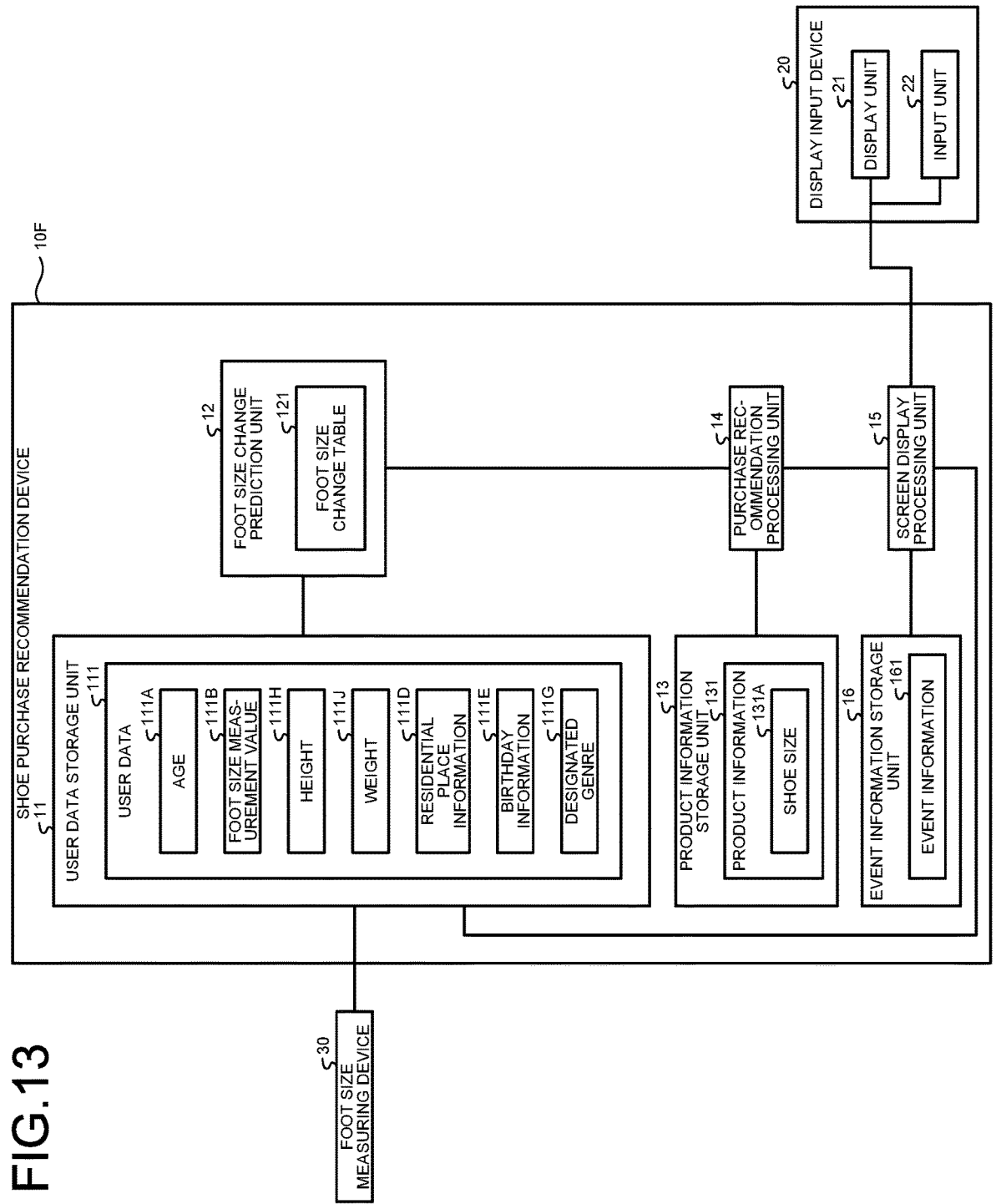
FIG. 13 is a diagram illustrating a configuration of a shoe purchase recommendation device according to a sixth embodiment of the present invention.

FIG. 13 is a diagram illustrating a configuration of a shoe purchase recommendation device according to a sixth embodiment of the present invention. The shoe purchase recommendation device 10F according to the sixth embodiment is different from the shoe purchase recommendation device 10D according to the fourth embodiment in that a designated genre 111G, which is a sports genre designated by a user, is included in user data 111.

A screen display processing unit 15 determines an event to be displayed as a regional event icon 201F from among the events registered in event information 161 on the basis of the designated genre 111G.

The shoe purchase recommendation device 10F according to the sixth embodiment displays a notification screen 200 similar to the notification screen 200 of the shoe purchase recommendation device 10D according to the fourth embodiment, on a display input device 20.

The shoe purchase recommendation device 10F according to the sixth embodiment can display the event of the sports genre designated in advance by the user, with the event icon 201E or the regional event icon 201F, and thus can notify the user of the date on which the event of interest to the user occurs, in an easy-to-understand manner.

Note that approximate genres may be set in advance for sports genres that can be designated as the designated genre 111G such that, when the event is for an approximate genre even in a sports genre different from the designated genre 111G, the event icon 201E or the regional event icon 201F is displayed on the notification screen 200. For example, competition groups such as an indoor court category including basketball, volleyball, and badminton, an outdoor limited contact category including soccer, rugby, and baseball, and an outdoor non-contact category including tennis, lacrosse, and track and field events may be set such that the event icon 201E or the regional event icon 201F of the event of an approximate genre different from the designated genre 111G is displayed on the notification screen 200.

Figure 14:
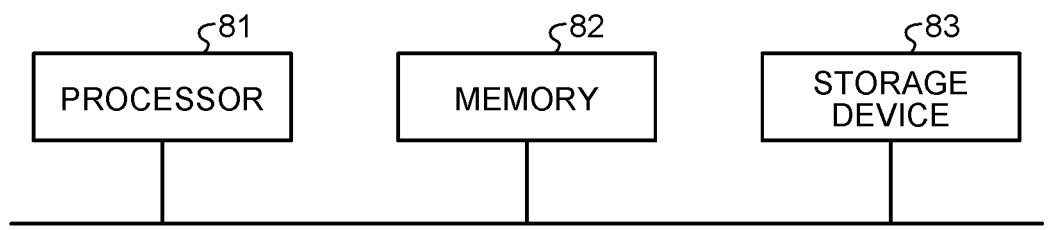
FIG. 14 is a diagram illustrating a hardware configuration example of the shoe purchase recommendation devices according to the first to sixth embodiments.

Next, a hardware configuration of the shoe purchase recommendation devices 10A, 10B, 10C, 10D, 10E, and 10F according to each of the above embodiments will be described. FIG. 14 is a diagram illustrating a hardware configuration example of the shoe purchase recommendation devices according to the first to sixth embodiments. FIG. 14 illustrates a hardware configuration in a case where the functions of the shoe purchase recommendation devices 10A, 10B, 10C, 10D, 10E, and 10F are implemented by using hardware that executes a program.

The shoe purchase recommendation devices 10A, 10B, 10C, 10D, 10E, and 10F include a processor 81 that executes various sorts of processing, a memory 82 that is a built-in memory, and a storage device 83 that stores information. The processor 81 reads the program stored in the storage device 83 into the memory 82 and executes the read program. The user data storage unit 11 and the product information storage unit 13 are implemented by the storage device 83.

As described above, the shoe purchase recommendation devices 10A, 10B, 10C, 10D, 10E, and 10F according to the present invention include: the user data storage unit 11 that stores the user data 111 including at least the age 111A and the foot size measurement value 111B of a user; the foot size change prediction unit 12 that calculates the change prediction value of the foot size of the user on the basis of the user data 111; the product information storage unit 13 that stores the product information 131 including the shoe size 131A; the purchase recommendation processing unit 14 that determines the purchase-recommended date of shoes on the basis of the change prediction value and the product information 131; and the screen display processing unit 15 that performs processing of displaying the notification screen 200 containing the calendar display area 201 in which the purchase-recommended date icon 201C indicating the purchase-recommended date and the measurement-recommended date icon 201A indicating the measurement-recommended date of the foot size are displayed on a calendar. Accordingly, the shoe purchase recommendation devices 10A, 10B, 10C, 10D, 10E, and 10F according to the present invention can notify the user of a timing appropriate for purchasing shoes in an easy-to-understand manner.

In addition, when the measurement-recommended date and the purchase-recommended date overlap, the screen display processing unit 15 performs processing of displaying one of the measurement-recommended date icon 201A and the purchase-recommended date icon 201C on the calendar and displaying an icon not displayed on the calendar in the sub-icon display area 203 provided outside the calendar, whereby the user can be notified of both of the measurement-recommended date and the purchase-recommended date even when the measurement-recommended date and the purchase-recommended date overlap.

In addition, when the measurement-recommended date and the purchase-recommended date overlap, the screen display processing unit 15 alters the color of the icon displayed on the calendar, whereby it can be made difficult for the user to overlook that the icon is displayed in the sub-icon display area 203.

In addition, when the measurement-recommended date and the purchase-recommended date overlap, the screen display processing unit 15 performs processing of displaying the measurement-recommended date icon 201A on the calendar and displaying the purchase-recommended date icon 201C in the sub-icon display area 203, whereby it can be made difficult for the user to forget to measure the foot size.

In addition, the event information storage unit 16 that stores the event information 161 is included, and the screen display processing unit 15 performs processing of displaying the notification screen 200 in which the event icon 201E indicating an event is displayed on the calendar on the basis of the event information 161, whereby the user can directly recognize the time-series relationship between the measurement-recommended date and the purchase-recommended date, and the date on which the event occurs.

In addition, when the date on which the event occurs overlaps with the measurement-recommended date or the purchase-recommended date, the screen display processing unit 15 performs processing of displaying the measurement-recommended date icon 201A or the purchase-recommended date icon 201C on the calendar and displaying the event icon 201E in the sub-icon display area 203, whereby the user can be notified of both of the measurement-recommended date or the purchase-recommended date and the date on which the event occurs even when the date on which the event occurs overlaps with the measurement-recommended date or the purchase-recommended date.

In addition, when the date on which the event occurs overlaps with the measurement-recommended date or the purchase-recommended date, the screen display processing unit 15 alters the color of the icon displayed on the calendar, whereby it can be made difficult for the user to overlook that the icon is displayed in the sub-icon display area 203.

In addition, the screen display processing unit 15 performs processing of displaying the notification screen containing the list display area 202 that displays a list of the measurement-recommended date, the purchase-recommended date, and the date on which the event occurs, whereby the user can easily grasp the measurement-recommended date, the purchase-recommended date, and the date on which the event occurs even when the number of events is large.

In addition, the residential place information 111D on the user is included in the user data 111, and the screen display processing unit 15 performs processing of displaying the notification screen 200 in which the event icon 201E of an event held in the region where the user lives is displayed on the calendar, whereby the user can be notified of information on an event held in a location that allows the user to participate in the event.

In addition, the birthday information 111E on the user is included in the user data 111, and the screen display processing unit 15 performs processing of displaying the notification screen 200 in which the birthday icon 201G indicating the birthday of the user is displayed on the calendar on the basis of the user data 111, whereby the user can be notified of the life event of the user in an easy-to-understand manner.

In addition, the event is a sporting ability measuring event in which the sporting ability of the user is measured, the sporting ability measurement value 111F, which is a measurement result for the sporting ability of the user measured in the sporting ability measuring event, is included in the user data 111, information on the desired sporting ability value 131B indicating the sporting ability coupled with each pair of shoes is included in the product information 131, and the purchase recommendation processing unit 14 determines the purchase-recommended date for the purchase-recommended product determined by prioritizing the shoes of which the desired sporting ability value 131B is equal to or less than the sporting ability measurement value 111F, from among the shoes fitting to the change prediction value, whereby the user can be notified of the purchase-recommended date of the shoes fitting to the sporting ability of the user in an easy-to-understand manner.

In addition, the purchase recommendation processing unit 14 determines the purchase-recommended date for the purchase-recommended product determined by prioritizing the shoes matching the sports genre of the event, from among the shoes fitting to the change prediction value, whereby the purchase of the shoes desired for participating in the event can be recommended to the user.

In addition, the designated genre 111G, which is a sports genre designated by the user, is included in the user data 111, and the screen display processing unit 15 performs processing of displaying the notification screen 200 in which the event icon 201E of an event for a sports genre matching the designated genre 111G is displayed on the calendar, whereby the user can be notified of the date on which the event of interest to the user occurs, in an easy-to-understand manner.

The configurations indicated in the above embodiments illustrate examples of the content of the present invention and can be combined with another known technique. A part of the configurations can be omitted or altered without departing from the gist of the present invention.

For example, an image of a foot print or a hand print created by cutting out a digital image of a sole or a palm captured by a terminal having an imaging function along a contour of the sole or the palm and transforming the cut-out image into an illustration may be allowed to be pasted as an icon to the calendar display area 201. By pasting the foot print or hand print icon to the calendar display area 201, the user can visually realize the change in the foot size or hand size of the child growing with the lapse of time, by viewing the date on which the hand print or foot print icon is pasted.

A shoe purchase recommendation device according to the present invention has an effect of enabling to notify a user of a timing appropriate for purchasing shoes in an easy-to-understand manner.

What is claimed is:

1. A shoe purchase recommendation device comprising:
   a memory that stores user data including at least an age of a user and a foot size measurement value of a size of a foot of the user and that stores product information including a shoe size; and
   a processor configured to:
      calculate a change prediction value of the size of the foot of the user on a basis of the user data and a prediction value of the size of the foot at a future time point based on the size of the foot and the change prediction value of the size of the foot;
      determine a purchase-recommended date of shoes on a basis of a foot size fitting range of the shoe size and the prediction value of the size of the foot at the future time point, the foot size fitting range of the shoe size being a range of a foot size that is less than the shoe size for which purchase of shoes having the shoe size is recommended; and
      control display of a notification screen containing a calendar display area including a calendar in which a purchase-recommended date icon indicating the purchase-recommended date is displayed,
      wherein the notification screen includes a measurement-recommended date icon that indicates a measurement-recommended date on which the user is recommended to measure the size of the foot of the user, and
      when the measurement-recommended date and the purchase-recommended date overlap, the processor is configured to control display of the measurement-recommended date icon or the purchase-recommended date icon on the calendar and display of an icon not displayed on the calendar in a sub-icon display area provided outside the calendar in the notification screen.

2. The shoe purchase recommendation device according to claim 1, wherein, when the measurement-recommended date and the purchase-recommended date overlap, the processor is configured to alter a color of an icon displayed on the calendar.

3. The shoe purchase recommendation device according to claim 1, wherein, when the measurement-recommended date and the purchase-recommended date overlap, the processor is configured to control display of the measurement-recommended date icon on the calendar and display of the purchase-recommended date icon in the sub-icon display area.

4. The shoe purchase recommendation device according to claim 1, further comprising an event information storage unit that stores event information,
wherein the processor is configured to control display of the notification screen in which an event icon indicating an event is displayed on the calendar, on a basis of the event information.

5. The shoe purchase recommendation device according to claim 4, wherein, when a date on which the event occurs overlaps with the measurement-recommended date or the purchase-recommended date, the processor is configured to control display of the measurement-recommended date icon or the purchase-recommended date icon on the calendar and display of the event icon in the sub-icon display area.

6. The shoe purchase recommendation device according to claim 5, wherein, when the date on which the event occurs overlaps with the measurement-recommended date or the purchase-recommended date, the processor is configured to alter a color of the icon displayed on the calendar.

7. The shoe purchase recommendation device according to claim 5, wherein the processor is configured to control display of the notification screen containing a list display area that displays a list of the measurement-recommended date, the purchase-recommended date, and the date on which the event occurs.

8. The shoe purchase recommendation device according to claim 4, wherein the user data includes residential place information on the user, and
the processor is configured to control display of the notification screen in which the event icon of the event held in a region where the user lives is displayed on the calendar.

9. The shoe purchase recommendation device according to claim 4, wherein the user data includes birthday information on the user, and
the processor is configured to control display of the notification screen in which a birthday icon indicating a birthday of the user is displayed on the calendar, on a basis of the user data.

10. The shoe purchase recommendation device according to claim 4, wherein the event is a sporting ability measuring event in which sporting ability of the user is measured,
the user data includes a sporting ability measurement value, which is a measurement result for the sporting ability of the user measured in the sporting ability measuring event,
the product information includes information on a desired sporting ability value indicating the sporting ability coupled with each pair of shoes, and
the processor is configured to determine the purchase-recommended date for a purchase-recommended product determined by prioritizing the shoes of which the desired sporting ability value is equal to or less than the sporting ability measurement value, from among the shoes fitting to the change prediction value.

11. The shoe purchase recommendation device according to claim 4, wherein the processor is configured to determine the purchase-recommended date for a purchase-recommended product determined by prioritizing the shoes matching a sports genre of the event, from among the shoes fitting to the change prediction value.

12. The shoe purchase recommendation device according to claim 4, wherein the user data includes a designated genre, which is a sports genre designated by the user, and
the processor is configured to control display of the notification screen in which the event icon of the event for the sports genre matching the designated genre is displayed on the calendar.

* * * * *